United States Patent [19]

Rabinovich et al.

[11] Patent Number: 5,829,345
[45] Date of Patent: Nov. 3, 1998

[54] DEVICES AND METHODS FOR ISOLATING SEEDS OF VEGETABLES AND FRUITS AND FOR RELEASING AND SEPARATING SAME FROM COATS

[75] Inventors: Gregory Rabinovich; Alexander Tanklevsky; Mira Rabinovich, all of Beer Sheva, Israel

[73] Assignee: Inter-Nevet Ltd., Ness Ziona, Israel

[21] Appl. No.: 740,515

[22] Filed: Oct. 30, 1996

[51] Int. Cl.$^6$ ........................................... A23N 1/00
[52] U.S. Cl. .................. 99/510; 99/511; 99/516; 99/537
[58] Field of Search ............... 99/510, 511, 514, 99/516, 537, 538, 542, 547; 241/83, 84, 85, 86, 86.1

[56] References Cited

U.S. PATENT DOCUMENTS 1,097,213  5/1914  Crine .
2,340,313  2/1944  Earle ............................................ 83/28

Primary Examiner—Laurie Scheiner
Assistant Examiner—Jeffrey Stucker
Attorney, Agent, or Firm—Mark M. Friedman

[57] ABSTRACT

Devices and corresponding mechanical non-fermentive methods for isolating seeds from fruits or vegetables and for releasing and separating the isolated seeds from their coats, according to one embodiment the device includes a first station including a first chamber and a second chamber at least partly separated therebetween by a perforation element, the first chamber engages a mixing mechanism for circulating a coated seeds including liquid mixture such that the coated seeds are scraped against the perforation element and passing through the element into the second chamber, the device further includes a second station including a third chamber engaging a vortexing mechanism for vortexing the liquid mixture, such that the seeds resulting from the first station are scraped against one another, thereby releasing the seeds from their coats, the device further includes drains for separating the released seed coats from the naked seeds.

22 Claims, 9 Drawing Sheets

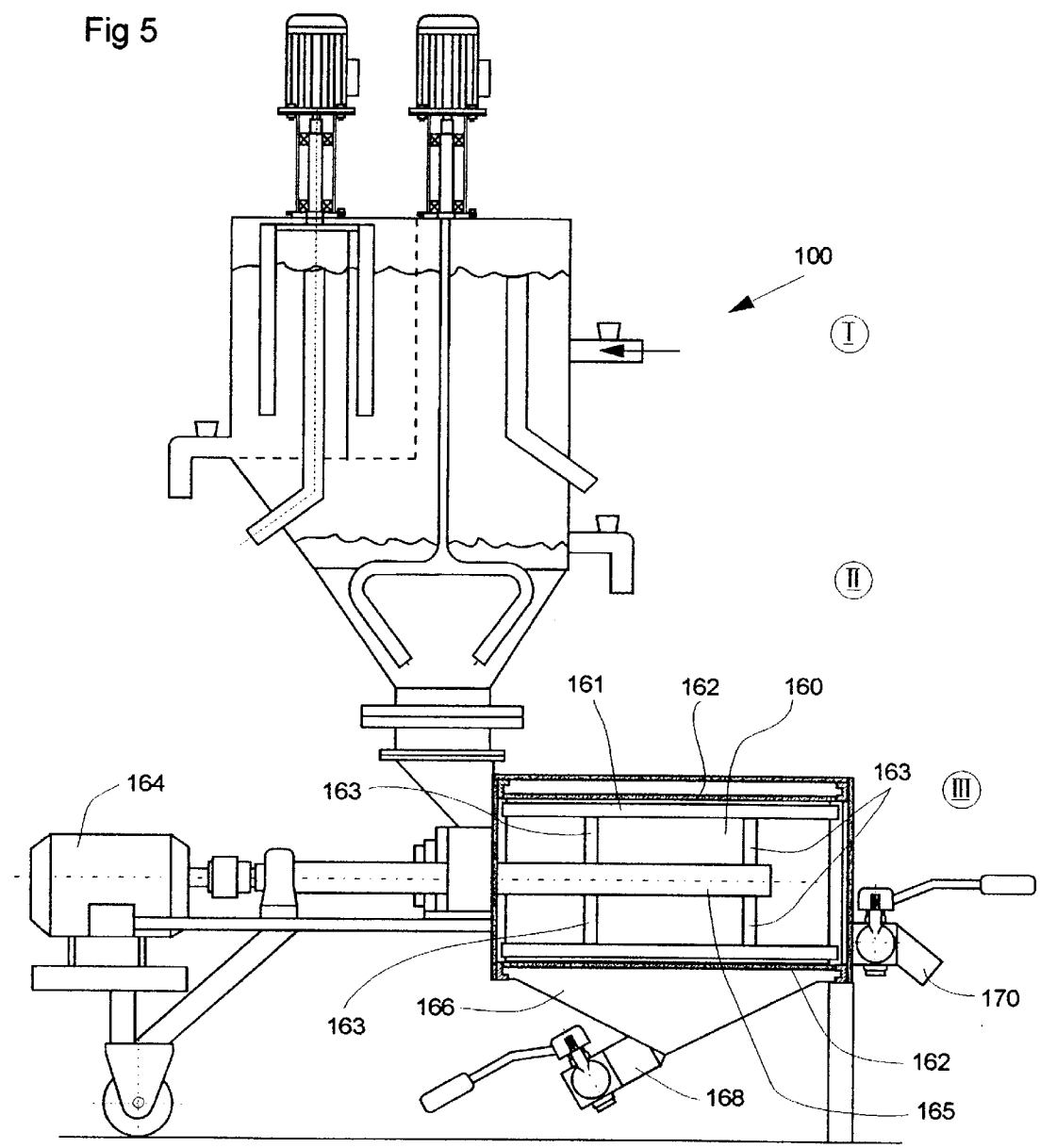

DEVICES AND METHODS FOR ISOLATING SEEDS OF VEGETABLES AND FRUITS AND FOR RELEASING AND SEPARATING SAME FROM COATS

FIELD AND BACKGROUND OF THE INVENTION

The present invention relates in general to devices and methods for seeds production. More particularly, the present invention relates to devices and corresponding mechanical non-fermentive methods for isolating seeds of vegetables and fruits and for releasing and separating the isolated seeds from their coats, such as pellicles and mucous, as part of their commercial preparation for storage followed by sowing and germination in a later time.

Seeds of various vegetables and fruits, such as for example melon, watermelon and tomato seeds, are subjected to a commercial production process preparing them for storage and marketing.

The first step in the production process of seeds includes isolating the seeds fro the fruit/vegetable, releasing the seeds from their coats, such as pellicles and mucous, and separating the naked (i.e., peeled, core) seeds from debris formed during any of these stages. Additional steps include sterilization and disinfecting the seeds, suitable packaging, etc.

Tomato seeds, for example, are a byproduct of the preserved tomato products industry. With reference now to FIG. 1, presented is a part of a tomato juice manufacturing line referred to hereinbelow as line 10. It should be noted that in different scales line 10 is suitable for isolation of seeds larger or smaller than tomato seeds.

Line 10 includes a conveyor 12 feeding a seeds extraction device 14 with whole tomatoes. Device 14 is directed at producing tomato juice free of peels and seeds, in three successive processing steps as delineated hereinbelow. Conveyor 12 typically includes a horizontal roller or belt type conveyor 16 followed by a vertical or diagonal steps conveyor 18. As mentioned, conveyor 12 is for feeding seeds extraction device 14 with tomatoes, which feeding is typically aided by a suitable first funnel 20.

Seeds extraction device 14 is characterized by three processing steps: (i) a chopping and mashing step; (ii) a peels separation step and (iii) a seeds extraction step, and accordingly includes (i) a chopping and mashing mechanism 22, equipped with rotating blades 24; (ii) a horizontal peels and debris separation drum 26 and (iii) a horizontal seeds extraction drum 28.

Seeds extraction device 14 is constructed and operated as follows. First funnel 20 feeds device 14 with whole tomatoes which are chopped and mashed, typically in the presence of added water, by chopping and mashing mechanism 22. The chopped and mashed product is then transferred into drum 26, via a second funnel 30, for peels and large debris separation. Drum 26 includes a first substantially cylindrical perforation element 32, enabling passage through of seeds and juice, yet restricting passage of peels and debris. Implemented within drum 26, typically in close proximity with element 32, are rotating impellers 31. Impellers 31 are connected via spacers (holders) 33 onto a first shaft 34, around which impellers 31 rotate via a first motor 35, thereby facilitating passage of juice, seeds and other small particles and small debris through first perforation element 32. Materials thus perforated are directed via a third funnel 37 into a first collector 36.

Drum 26 further includes a peels discarding funnel 47, through which peels are discarded as waste when their amount within drum 26 exceeds a certain level, as more and more material enters drum 26 via funnel 30.

For seeds extraction, the substantially peels-free product of drum 26 is transferred into drum 28 via a fourth funnel 38, which is in communication with first collector 36, which collects the material resulting from drum 26, perforated through element 32.

Drum 28 includes a second substantially cylindrical perforation element 39, enabling passage through of juice, yet restricting passage of seeds and most other solid particles and debris. Similar to drum 26, implemented within drum 28 are rotating impellers 41 connected via spacers 43 onto a second shaft 40, around which they rotate via a second motor 42. Thereby, impellers 41 facilitate passage of juice through second perforation element 39. The juice thus perforated is directed via a fifth funnel 45, a second collector 49 and valve 43 operated sixth funnel 44, into a juice container or line of further manipulation, e.g., bottling, sterilization, etc., (not shown).

Drum 28 further includes a seeds discarding funnel 48, through which seeds are discarded as a byproduct into a seeds container or line for further treating seeds (not shown) when their amount within drum 28 exceeds a certain level, as more and more material enters drum 28 via funnel 38. The seeds thus collected are thereafter used as a raw material for a commercial seeds production process.

As mentioned, lines such as line 10 of FIG. 1 are directed at juice manufacturing, whereas the seeds are actually the waste or by product, discarded at the end of the line.

Two major limitations are associated with seeds extraction device 14, should the seeds be used as the raw material for a commercial seeds production process. First, while passing through drum 26, a quite large fraction of the seeds adhere to the peels and other large debris and are discarded as waste via funnel 47. And second, the seeds obtained are substantially completely coated.

Commercial seeds production processes may be categorized into fermentive and non-fermentive processes.

According to the fermentive process, the raw material including coated seeds as described above is subjected to biological facilitated fermentation, resulting in acidification. Due to the low pH, the seed coats, such as pellicles and mucous, breakdown, leaving the seeds naked, forming debris of relatively smaller size and lighter weight. The naked seeds are then separated from thus formed debris by differential filtration and/or centrifugation, based on their relative size and/or weight, respectively. However, the fermentive process thus described is (i) time consuming, e.g., 24–48 hours, depending on temperature and inoculation titer of fermentive organisms; (ii) non-continuos in nature; and (iii) less reproducible in nature.

According to the non-fermentive process, the raw material which includes coated seeds as described above is subjected to a mechanical process facilitating the release and separation of coats such as pellicles and mucous from the seeds.

With reference now to FIG. 2, described is a mechanical seeds uncoating device, referred to hereinbelow as device 50. A seed 51 typically includes a core (i.e., a naked, peeled, uncoated seed) 52 and seed coats 54. Seed coats 54 typically include a pellicle 56 surrounded by mocous 58. Device 50 includes a wide pipe 60 connected to a high pressure water source as indicated by arrow 62 and at least one net structure 64. The high pressure water flow forces coated seeds against net 64, itself selected having perforations 66 wide enough to permit passage through of only uncoated seeds 52. Thereby, upon passing through perforations 66 of net 64, coated seeds 51 lose their coats 54.

The mechanical process thus described for uncoating seeds is simple and effective, yet has a major drawback. Since this process consumes a vast amount of water which has to be supplied under high pressure, it is therefore wasteful and costly, especially in places around the globe where water is a scarce resource. Furthermore, discarding large quantities of polluted water creates an ecological problem.

Additional approaches and devices for commercial seeds production are disclosed in U.S. Pat. Nos. Re. 26,201; 234,946; 361,344; 580,401; 720,122; 1,874,181; 1,956,615; 2,089,071; 2,289,445; 2,340,313; 2,379,184; 2,503,852; 2,657,801; 2,708,627; 2,730,148; 2,976,992; 3,419,056; 3,818,822; 4,609,110; 4,721,627; 4,981,220; and 5,096,719. Nevertheless, many of these devices were never reduced down to practice as they suffer one of the above or other limitations.

There is thus a widely recognized need for, and it would be highly advantageous to have, devices and corresponding mechanical non-fermentive methods for isolating seeds of vegetables and fruits and for releasing and separating the seeds from their coats, devoid of the above mentioned limitations.

SUMMARY OF THE INVENTION

According to the present invention there are provided devices and corresponding mechanical non-fermentive methods for isolating seeds of vegetables and fruits and for releasing and separating the isolated seeds from their coats such as pellicles and mucous.

According to further features in preferred embodiments of the invention described below, provided is a device for releasing and separating seeds of vegetables or fruits from their coats such as peels and mucous, the device comprising (a) a first station for releasing and separating the seeds from their coats, the first station including (i) a container including a first chamber and a second chamber, the first and second chambers being at least partly separated therebetween by a perforation element, the first chamber being fed with a liquid mixture including coated seeds, the second chamber including a first upper drain, the container includes a first water inlet; and (ii) a mixing mechanism for circulating the liquid mixture within the first chamber, such that the coated seeds are scraped against the perforation element and are forced through the element from the first chamber into the second chamber, thereby at least part of the seeds are released from at least part of their coats to become at least partially naked seeds, wherein the separated coats form a lighter debris which is separated from the liquid mixture via the first upper drain by addition of water via the first water inlet.

According to still further features in the described preferred embodiments the device further comprising (b) a second station for further releasing and separating the seeds from their coats, the second station including (i) a third chamber being fed with the liquid mixture resulting from the first station, the third chamber including a second upper drain and a second water inlet; and (ii) a vortexing mechanism for vortexing the liquid mixture resulting from the first station, such that the seeds resulting from the first station are scraped against one another, thereby further releasing the seeds from their coats, wherein the further released coats form a further light debris which is separated from the liquid mixture in the third chamber via the second upper drain by addition of water via the second water inlet.

According to still further features in the described preferred embodiments the first chamber is substantially cylindrical.

According to still further features in the described preferred embodiments the first chamber includes a third upper drain.

According to still further features in the described preferred embodiments the first and third upper drains combine to a mutual outlet.

According to still further features in the described preferred embodiments the second chamber has a lower section forming the third chamber, rendering the second and third chambers a single chamber.

According to still further features in the described preferred embodiments the first and second upper drains are a single upper drain.

According to still further features in the described preferred embodiments the first and second water inlets are a single water inlet.

According to still further features in the described preferred embodiments the first chamber includes a lower valved outlet for periodically cleaning the first chamber.

According to still further features in the described preferred embodiments the second chamber includes a lower valved outlet for periodically cleaning the second chamber.

According to still further features in the described preferred embodiments the third chamber includes a lower valved outlet for periodically cleaning the third chamber.

According to still further features in the described preferred embodiments the mixing mechanism is selected from the group consisting of a first motor operated mixer, a centrifugation mechanism and a water stream based mixing mechanism.

According to still further features in the described preferred embodiments the vortexing mechanism includes a second motor operated mixer, the mixer includes a compressed gas release system, when operated, the mixer and the release of compressed gas collectively provide a vortexing effect.

According to still further features in the described preferred embodiments the device further comprising (c) a third station for further releasing the seeds from their coats, the third station including (i) a direction changing tube being fed with the liquid mixture resulting from the second station, the direction changing tube having innerwalls and being oriented in space, such that gravitation forces the liquid mixture through the tube and such that the seeds resulting from the second station are subjected to a centrifugal force and are therefore scraped against the innerwalls, thereby the direction changing tube further releases the seeds from their coats.

According to still further features in the described preferred embodiments the direction changing tube is spiral.

According to still further features in the described preferred embodiments the device further comprising a gated pathway for communicating between the second and third stations.

According to still further features in the described preferred embodiments the device further comprising (d) a fourth station for further separating the seeds from their coats, the fourth station including a differential weight separation mechanism.

According to still further features in the described preferred embodiments the differential weight separation mechanism includes a chute spillway.

According to still further features in the described preferred embodiments the device further comprising (c) a third station for further separating the seeds from their coats, the third station including (i) a horizontal drum including a substantially cylindrical second perforation element, the second perforation element permitting passage through of small debris, seed coats and liquids, yet restricting passage through of the naked seeds, the drum further including rotatable impellers for fastening the passage of the debris, seed coats and liquids through the second perforation element.

According to still further features in the described preferred embodiments the device further comprising a gated pathway for communicating between the second and third stations.

According to still further features in the described preferred embodiments provided is a method for releasing and separating seeds of vegetables and fruits from their coats such as peels and mucous, the method comprising the steps of (a) releasing and separating coated seeds from their coats by circulating a liquid mixture including the coated seeds against a perforation element such that the coated seeds are scraped against the perforation element and are forced through the perforation element, thereby at least part of the seeds are released from their coats to become at least partially naked seeds, wherein the separated coats form a light debris which is separated from the liquid mixture via a first differential weight separation mechanism.

According to still further features in the described preferred embodiments the method further comprising the step of (b) further releasing and separating coated seeds from their coats by vortexing the liquid mixture resulting from step (a), such that the seeds resulting from step (a) are scraped against one another, thereby further releasing the seeds from their coats, wherein the further released coats form a further light debris which is separated from the liquid mixture via a second differential weight separation mechanism.

According to still further features in the described preferred embodiments the method further comprising the step of (c) further releasing coated seeds from their coats by driving the liquid mixture resulting from step (b) via a direction changing tube having innerwalls, such that the seeds resulting from step (b) are scraped against the innerwalls, thereby further releasing the seeds from their coats, wherein the further released coats form a further light debris.

According to still further features in the described preferred embodiments the method further comprising the step of (d) further separating naked seeds from their coats by subjecting the liquid mixture resulting from step (c) to a third differential weight separation mechanism.

According to still further features in the described preferred embodiments the direction changing tube is spiral.

According to still further features in the described preferred embodiments the first differential weight separation mechanism includes an upper drain.

According to still further features in the described preferred embodiments the second differential weight separation mechanism includes an upper drain.

According to still further features in the described preferred embodiments the third differential weight separation mechanism includes a chute spillway.

According to still further features in the described preferred embodiments the method further comprising the step of (c) further separating naked seeds from their coats and liquids by subjecting the liquid mixture resulting from step (b) to a size based filtration mechanism.

According to still further features in the described preferred embodiments the size based filtration mechanism includes a horizontal drum which includes a substantially cylindrical second perforation element, the second perforation element permitting passage through of small debris, seed coats and liquids, yet restricting passage through of the naked seeds, the drum further including rotatable impellers for fastening the passage of the debris, seed coats and liquids through the second perforation element.

According to still further features in the described preferred embodiments provided is a seed extraction device for isolating juice and seeds from fruits or vegetables and for at least partially releasing and separating the seeds from seed coats, the device comprising (a) a chopping and mashing mechanism for chopping and mashing the fruits or vegetables into a mash; (b) a horizontal peels and debris separation drums arrangement, for accepting the mash, the horizontal peels and debris separation drums arrangement including (i) a first compartment including a first perforation element enabling passage through of the juice and seeds, yet restricting passage through of peels, the first compartment further including a first set of rotating impellers for facilitating the passage of the juice and seeds through the first perforation element; and (ii) a second compartment, being in communication via a dedicated low opening with the first compartment through which the second compartment being fed with the peels and seeds adhered thereto, the second compartment including a second perforation element enabling passage through of the seeds, yet restricting passage through of the peels, the second compartment further including a first water inlet for hydrating the seeds and peels, and a second set of rotating impellers for facilitating passage of water and seeds through the second perforation element; and (c) a horizontal seeds extraction drums arrangement for accepting the juice and seeds resulting from the horizontal peels and debris separation drums arrangement, for isolating the juice from seeds and for partially releasing the seeds from their coats, the horizontal seeds extraction drums arrangement including (i) a third compartment communicating with the first compartment for accepting the juice and seeds resulting therefrom, the third compartment including a third perforation element enabling passage through of the juice, yet restricting passage through of the seeds and further including a third set of rotating impellers for facilitating the passage through of the juice; and (ii) a fourth compartment being in communication via a dedicated second low opening with the third compartment through which the fourth compartment being fed with the seeds accumulating in the third compartment, the fourth compartment is further communicating with the second compartment for accepting the seeds resulting therefrom, the fourth compartment including a fourth perforation element permitting passage through of liquids yet restricting passage through of seeds, and further including a rotary water sprinkler having at least one water outlet positioned such that when water under high pressure is forced therethrough, the sprinkler rotates and the seeds within the fourth compartment are scraped against the fourth perforation element and against each other and are therefore at least partially released from their coats, the coats forming a debris at least partly separated from the seeds through the fourth perforation element.

According to still further features in the described preferred embodiments provided are supplements to be added to a conventional seed extraction device, the supplemented device is for isolating juice and seeds from fruits or vegetables and for at least partially releasing and separating the seeds from seed coats, the device including (a) a chopping and mashing mechanism for chopping and mashing the fruits or vegetables into a mash; (b) a first compartment for accepting the mash, the first compartment including a first perforation element enabling passage through of the juice and seeds, yet restricting passage through of peels, the first compartment further including a first set of rotating impellers for facilitating the passage of the juice and seeds through the first perforation element; and (c) a third compartment communicating with the first compartment for accepting the juice and seeds resulting therefrom, the third compartment including a third perforation element enabling passage through of the juice, yet restricting passage through of the seeds and further including a third set of rotating impellers for facilitating the passage through of the juice; the supplements comprising (a) a second compartment, being in communication via a dedicated low opening with the first compartment through which the second compartment being fed with the peels and seeds adhered thereto, the second compartment including a second perforation element enabling passage through of the seeds, yet restricting passage through of the peels, the second compartment further including a first water inlet for hydrating the seeds and peels, and a second set of rotating impellers for facilitating passage of water and seeds through the second perforation element; and (b) a fourth compartment being in communication via a dedicated second low opening with the third compartment through which the fourth compartment being fed with the seeds accumulating in the third compartment, the fourth compartment is further communicating with the second compartment for accepting the seeds resulting therefrom, the fourth compartment including a fourth perforation element permitting passage through of liquids yet restricting passage through of seeds, and further including a rotary water sprinkler having at least one water outlet positioned such that when water under high pressure is forced therethrough, the sprinkler rotates and the seeds within the fourth compartment are scraped against the fourth perforation element and against each other and are therefore at least partially released from their coats, the coats forming a debris at least partly separated from the seeds through said fourth perforation element.

The present invention successfully addresses the shortcomings of the presently known configurations by providing a seeds extraction device highly suitable for both juice manufacturing and to better exploit seeds production and by providing devices and method for releasing and separating seeds of vegetables and fruits from their coats, which devices and method enable quick and water saving production of seeds of various vegetables and fruits.

BRIEF DESCRIPTION OF THE DRAWINGS

The invention herein described, by way of example only, with reference to the accompanying drawings, wherein:

FIG. 3b is a simplified sagittal cross section through the first station presented in FIG. 3a;

FIG. 4a is a side view of the third station which includes a direction changing spiral tube, also presented in FIG. 3a;

FIG. 4b is a top view of a part of a the tube presented in FIG. 4a;

FIG. 5 is a longitudinal cross section of the first, second and a modified third station of the device for releasing and separating seeds of vegetables and fruits from their coats, according to the present invention;

FIG. 9a is a view taken along section line A—A in FIG. 8a; and

DESCRIPTION OF THE PREFERRED EMBODIMENTS

Figure 1:
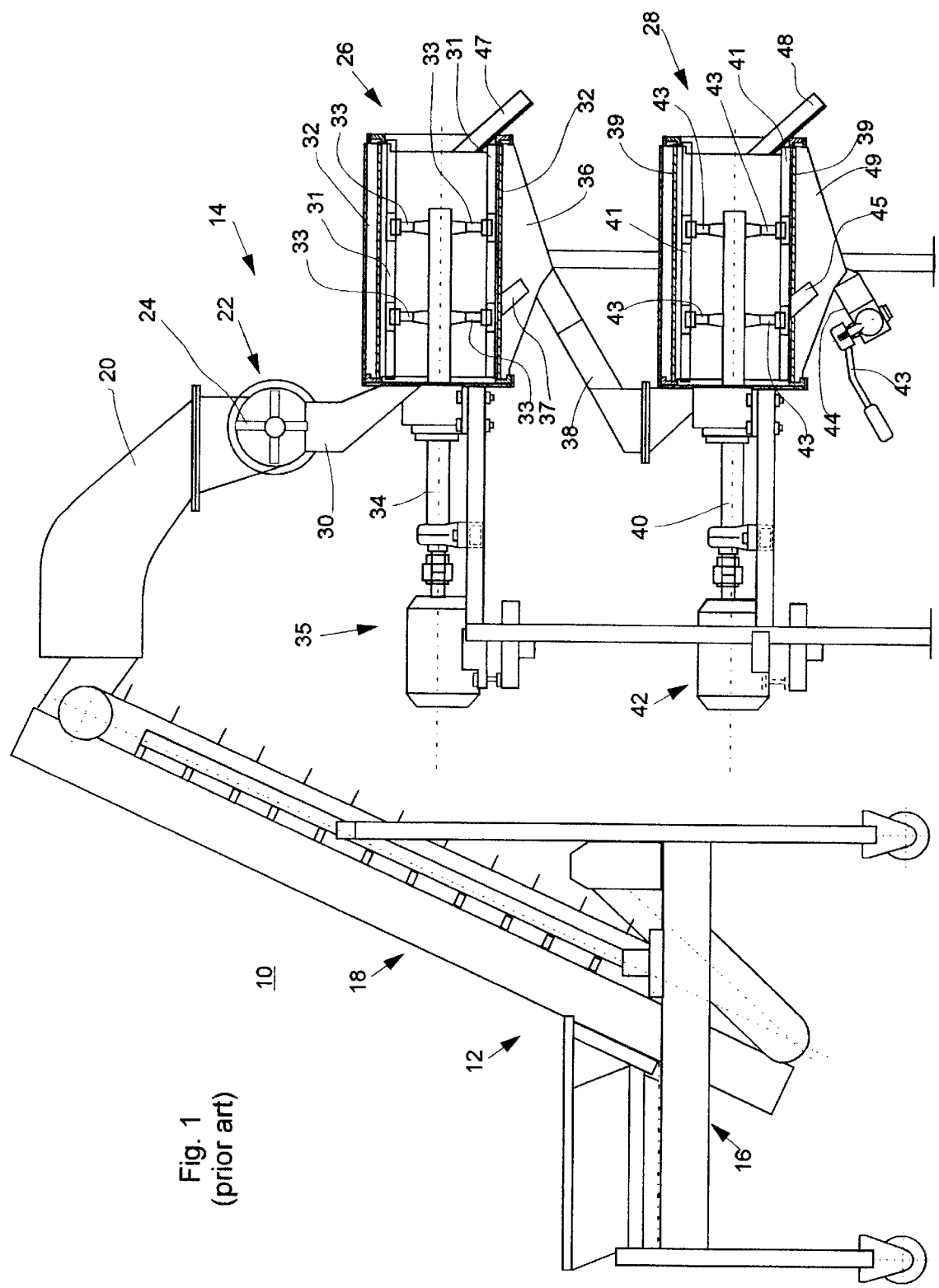
FIG. 1 is a cross section through a part of a prior art tomato juice manufacturing line including a conveyor feeding a seed extraction device with whole tomatoes for seeds and peels free tomato juice manufacturing.

The present invention is of devices and corresponding mechanical non-fermentive methods for isolating seeds of vegetables and fruits and for releasing and separating the isolated seeds from their coats, which devices and methods can be used as a part of a commercial seeds production process aimed at preparing the seeds for storage, thereafter followed by sowing and germination. Specifically, the present invention can be used to commercially produce tomato, melon, watermelon, etc., seeds in a short period of time, not wasting vast amounts of water.

The principles and operation of devices and methods according to the present invention may be better understood with reference to the drawings and accompanying descriptions.

Referring now to the drawings, FIGS. 3–6 illustrate a few embodiments of the device for releasing and separating seeds of vegetables and fruits from their coats according to the present invention, referred to hereinbelow as device 100.

Device 100 includes two, preferably three, more preferably four stations for releasing and/or separating seeds from their coats. The term 'releasing', as used herein in this document and especially in the claims section below, refers to the action of uncoating coated seeds from their coats to obtain naked seeds and seed coats debris, the term 'separation', as used herein, refers to the action of separating the naked seeds from thus formed debris, to obtain separated naked seeds, whereas the terms 'isolating' as used herein refers to the action of the first isolation of coated seeds from the fruit or vegetable itself, as for example by the prior art seeds extraction device 14 of FIG. 1, described in the background section above.

The raw material typically fed into device 100, for example by using a feeding pipe 101, may be coated seeds derived as a by product of the preserved products industry as described above for the preserved tomato products industry, yet as will be appreciated by one ordinarily skilled in the art, the raw material fed into device 100 may also be a crude mash or extract of the fruit or vegetable of choice, which mash includes seeds in their native (i.e., coated) form.

Figure 3A:
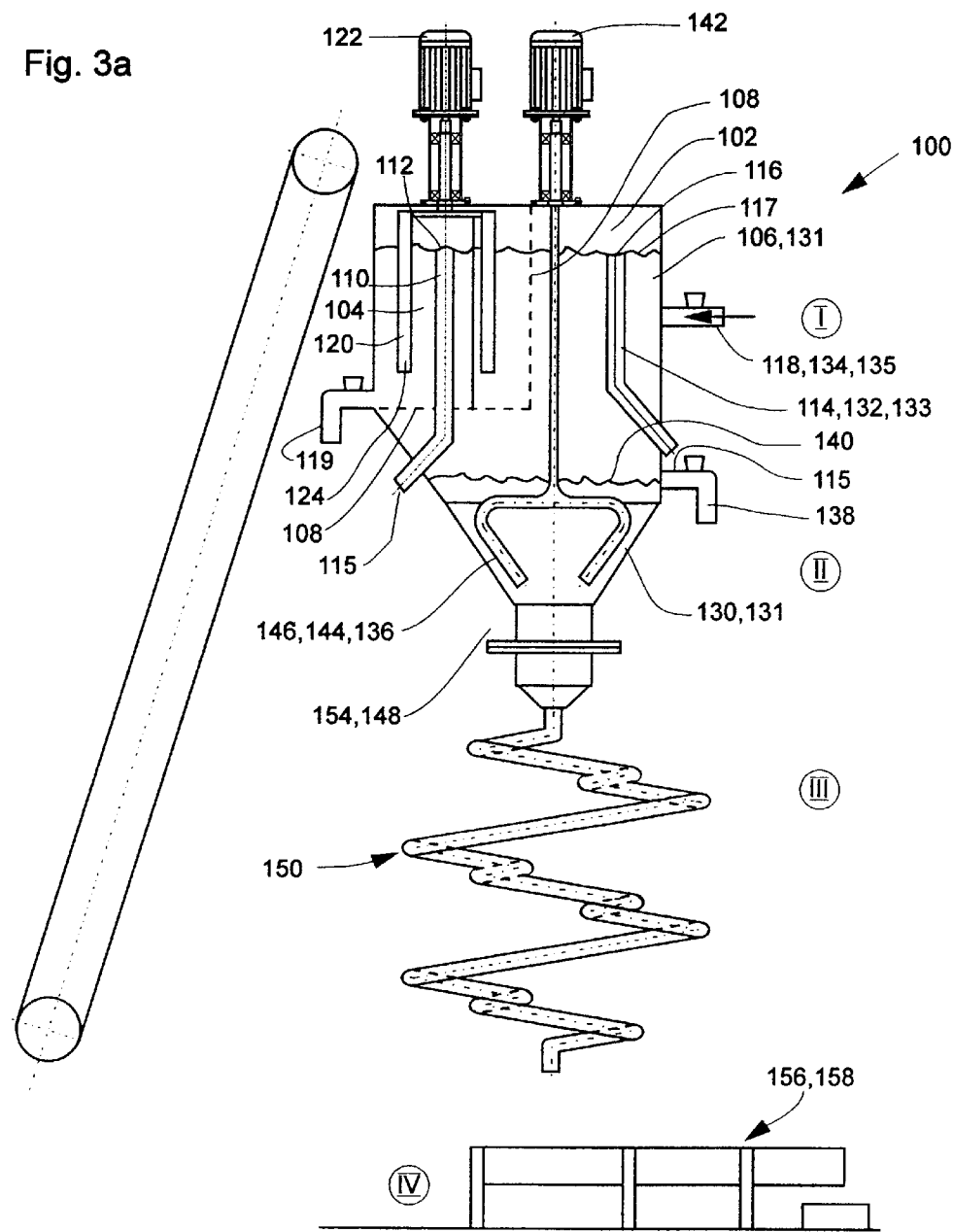
FIG. 3a presents longitudinal cross sections of a first station and a second station, and side views of a third station and a fourth station of a device for releasing and separating seeds of vegetables and fruits from their coats, according to the present invention.
Figure 3B:
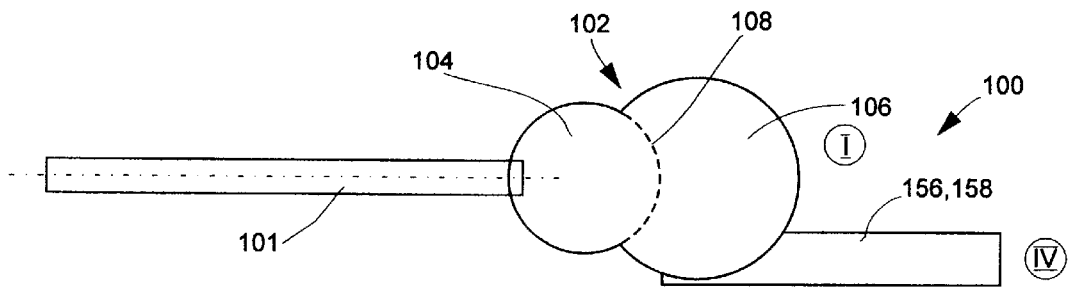

As shown in FIGS. 3a–b, the first station of device 100, indicated as station I, includes a container 102 which is divided into a first chamber 104 and a second chamber 106. Chambers 104 and 106 of container 102 are at least partly separated therebetween by a perforation element 108. In various embodiments according to the invention a perforation element is used. The perforation characteristics of each of the elements are described with respect to seeds, peels, coats, etc. It should therefore be understood that the actual size of the perforations in the perforation element may vary in size to a great extent (e.g., 10 fold or more), when used for seeds production of different fruits and vegetables.

Chamber 106 includes a first upper drain 114 having a first upper outlet 116. Preferably, chamber 104 also includes an upper drain 110 (referred to in the claims section below as a third upper drain) having an upper outlet 112. The locations of outlets 112 and 116 dictate the maximal level 117 of liquid preferably contained in container 102. In one embodiment each of upper drains 110 and 114 includes an independent outlet 115, yet in a preferred embodiment drains 110 and 112 combine to a mutual outlet (not shown).

Container 102 further includes a first water inlet 118. It should be noted that when the term 'inlet' is used herein in this document and especially in the claims section below, it refers to any opening which is directly connected to a water source or to an opening through which water can be applied. Since chambers 104 and 106 are in communication with one another via perforation element 108, water inlet 118 can be located in communication with either chambers 104 or 106.

As further shown in FIG. 3a, station I of device 100 further includes a mixing mechanism 120 for circulating or steering the coated seeds and liquid mixture within chamber 104, such that the coated seeds are scraped against perforation element 108 and are forced to pass through the perforations of element 108 from first chamber 104 into second chamber 106, thereby at least part of the coated seeds are released from at least part of their coats to become at least partially naked seeds.

From the above description, it will be appreciated that mixing mechanism 120 is aimed at generating a centrifugation effect within the liquid mixture contained in chamber 104, thereby to force the coated seeds, which form the heaviest ingredient of the mixture, against and through perforation element 108. It will be further appreciated that perforation element 108 aided by thus formed centrifugal force, performs a dual uncoating action, wherein (i) coated seeds are scraped against its rough perforated surface; and (ii) are forced through the perforations of element 108. Both actions contribute to the seeds uncoating (i.e., coat releasing) process.

Mixing mechanism 120 may be any suitable mechanism for generating a centrifugation effect as described. One example is given in FIG. 3a, wherein mixing mechanism 120 is a simple first motor 122 operated mixer 124. Nevertheless, it will be appreciated by one ordinarily skilled in the art (i) that a centrifugation mechanism, wherein motor 122 rotates first chamber 104 relative to container 102 and (ii) that a water stream based mixing mechanism, wherein a water inlet is situated as to direct a strong water stream(s) into first chamber 104, e.g., by a high pressure sprinkling mechanism, such that the liquid and seeds within chamber 104 will circulate, are all possible substitutes for first motor operated mixer 124, although presently less favorable.

As best seen in FIG. 3b, for most efficient operation of mixing mechanism 120, first chamber 104 is preferably selected having a substantially cylindrical shape.

The combined effect of mixing mechanism 120 and perforation element 108 results in at least partially releasing the coats from the coated seeds fed into chamber 104, passage of the naked or partially naked seeds into chamber 106 and formation of debris predominantly including fragments of released seed coats. It will be appreciated that thus formed debris is smaller in size than naked seeds and therefore is distributed through perforation element 108 in both first 104 and second 106 chambers of container 102. It will be further appreciated that the formed debris is lighter than the naked seeds, in fact it is light enough to float over water, and may therefore be discarded through upper drains 110 and 114 by addition of water via water inlet 118, in a fashion similar to the weight based separation effect of a hydraulic chute.

Periodically it is desired to clean device 100. Therefore, in preferred embodiments first chamber 104 and/or second chamber 106 include lower valved outlets 119 and/or 121, respectively.

As mentioned above, after being treated in station I, at least partially naked seeds accumulate in chamber 106 and are to undergo further releasing and separation steps, which steps are performed in a second station indicated as station II in FIG. 3a.

Station II is for further releasing and separating the seeds from their coats and includes a third chamber 130 which is fed with the at least partially naked seeds containing liquid mixture resulting from station I, as described above. Third chamber 130 includes a second upper drain 132 and a second water inlet 134. In a preferred embodiment and as shown in FIG. 3a, second chamber 106 has a lower section which forms third chamber 130, rendering the second and third chambers a single combined chamber 131. In the later case it is preferred that first 114 and second 132 upper drains will be formed as a single upper drain 133 and that first 118 and second 134 water inlets will be formed as a single water inlet 135.

Station II further includes a vortexing mechanism 136 for vortexing the liquid mixture resulting from station I, such that the seeds resulting from station I are scraped against one another, thereby further releasing the seeds from their coats, wherein the further released coats form a further light debris which is separated from the liquid mixture in third chamber 130 via second upper drain 132 by addition of water via second water inlet 134.

In a preferred practice, the operation of station II is as follows. The seeds contained in the liquid mixture resulting from station I are left to sink to the lower part of second chamber 106 which forms third chamber 130. The remaining liquid is discarded through valved outlet 138 to bring the liquid in chamber 130 to a lower level as indicated in FIG. 3a by 140, therefore the seeds become more concentrated. The seeds are than vortexed by vortexing mechanism 136 and due to their increased concentration frequently collide with one another and thus are further released from their coats.

Vortexing mechanism may be of any suitable type that is capable of vortexing the liquid contained in third chamber 130 such that the seeds will collide with one another with an energy sufficient for uncoating. One presently preferred example of vortexing mechanism 136 is given in FIG. 3a, and includes a second motor 142 operated mixer 144. Mixer 144 includes a compressed gas release system 146 (as indicated by dots) for releasing compressed gas into the liquid in chamber 130. The compressed gas itself is from any conventional compressed gas source (not shown) and is preferably compressed air. When operated, the mixing effect of mixer 144 and the release of compressed gas by system 146, collectively provide the desired vortexing effect. Nevertheless, it will be appreciated by one ordinarily skilled in the art, that other or additional vortexing mechanisms, such as for example a vibration mechanism, e.g., ultrasound vibration (not shown), may provide a similar effect.

While vortexing the seeds in chamber 130, additional light debris in the form of fragments of seed coats is formed and is to be separated from the further naked seeds obtained. For this purpose water inlet 135 is activated, and thus formed light debris is discarded via upper outlet 116 of drain 133.

In a preferred embodiment, third chamber 130 includes a third lower valved outlet 148 for periodical cleaning.

Figure 4A:
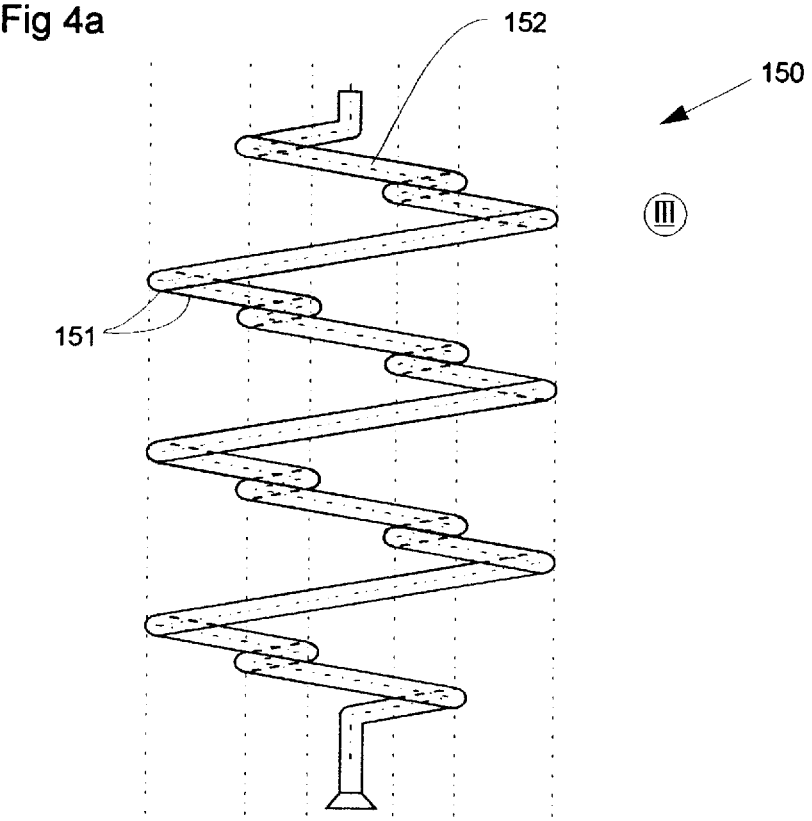
Figure 4B:
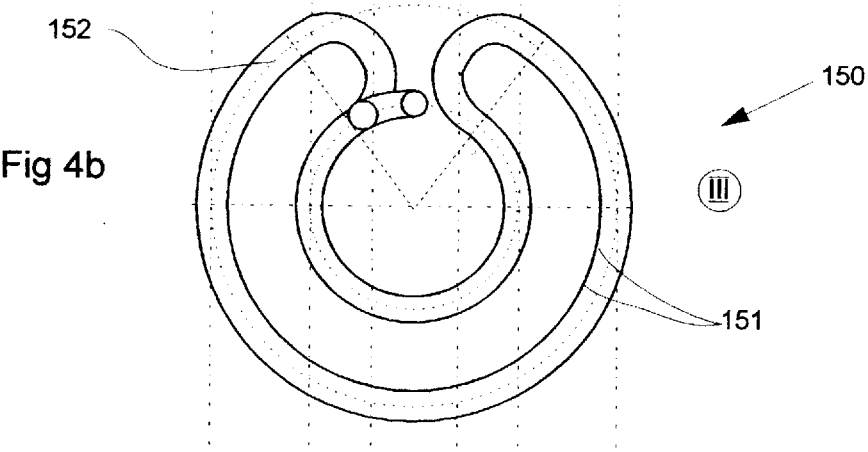

As further shown in FIG. 3a, and detailed in FIGS. 4a–b, device 100 preferably further includes a third station for further releasing the seeds from their coats, indicated as station III. Station III includes a direction changing tube 150 which is fed with the liquid mixture resulting from station II. Tube 150 has innerwalls 152 and is oriented in space such that gravitation forces the liquid mixture through it, such that seeds resulting from station II are scraped against innerwalls 152 of tube 150, thereby further releasing the seeds from their coats. Tube 150 is preferably spiral and has features rendering it suitable to uncoated seeds from all sides. It should be noted that when the term 'spiral' is used herein and especially in the claims section below in context of a direction changing tube, it refers to a continuos alternating arrangement of tube sections derived from simple unidirectional right and left spiral tubes. It will be appreciated that while the seeds containing mixture is flashed down tube 150, a direction changing centrifugation effect is formed, forcing the seeds, which are the heaviest ingredient of the mixture, against innerwalls 152. Since, as best seen in FIG. 4b, tube 150 alters its direction, different sides of the seeds are forced against innerwalls 152, which seeds are therefore released from their coats substantially evenly from all sides. Thus, station III provides device 100 with final seeds polishing capabilities. Tube 150 may have any cross section although a circular or elliptic cross section is presently preferred. Tube 150 may be fabricated from any suitable material, yet since tube 150 is to be formed bent forth and back to provide changes of directions as described above, it is presently preferred that tube 150 will be fabricated from an elastic material such as an elastic plastic or any other elastic polymeric material. For some applications it is preferred that innerwalls 152 of tube 150 will have a rough surface to facilitate their polishing capabilities. The preferred rough surface can be obtained by applying small ridges and grooves 151 to the surface of innerwalls 152.

In a preferred embodiment station III is in a controlled direct connection with station II, which connection is controlled by a suitable valve or a gated pathway 154, situated therebetween.

The liquid mixture resulting from station III includes naked seeds and further formed light debris which include seeds coat fragments. Thus formed debris is preferably separated from the naked seeds in a fourth station which is for further separating the seeds from their coats, indicated as station IV in FIG. 3a. Station IV includes a differential weight separation mechanism 156 to separate the heavier naked seeds from lighter debris which includes seed coat fragments. As exemplified in FIG. 3a, a suitable differential weight separation mechanism 156 may include a chute spillway, also known in the art as hydraulic chute 158.

With reference now to FIG. 5, according to another embodiment of the invention device 100 includes stations I and II as described above, yet station III is replaced by a modified third station indicated in FIG. 5 as station III'. A full description of stations I and II is given hereinabove and is therefore not repeated with context of FIG. 5.

Modified station III' is for further separating the seeds from their coats, and includes a horizontal drum 160, itself including a second substantially cylindrical perforation element 162 permitting passage through of small debris, seed coats and liquids, yet restricting passage through of the naked seeds. Similar to drum 28 of the prior art device 14 of FIG. 1, implemented within drum 160 are rotating impellers 161 connected via spacers 163 onto a shaft 165, around which impellers 161 rotate via a motor 164. Impellers 161 are positioned in close vicinity with respect to perforation element 162. Therefore, when impellers 161 rotate via motor 164, liquids and small debris are removed through perforation element 162 into a collector 166, and are discarded via gated funnel 168. At the same time, naked seeds are collected through seeds funnel 170. The seeds may be collected into a station IV as described above, or alternatively into a seeds container (not shown). Preferably the seeds are directed into further lines of seeds production such as disinfecting, drying, packaging lines, etc., by a suitable conveyor (not shown).

Figure 6:
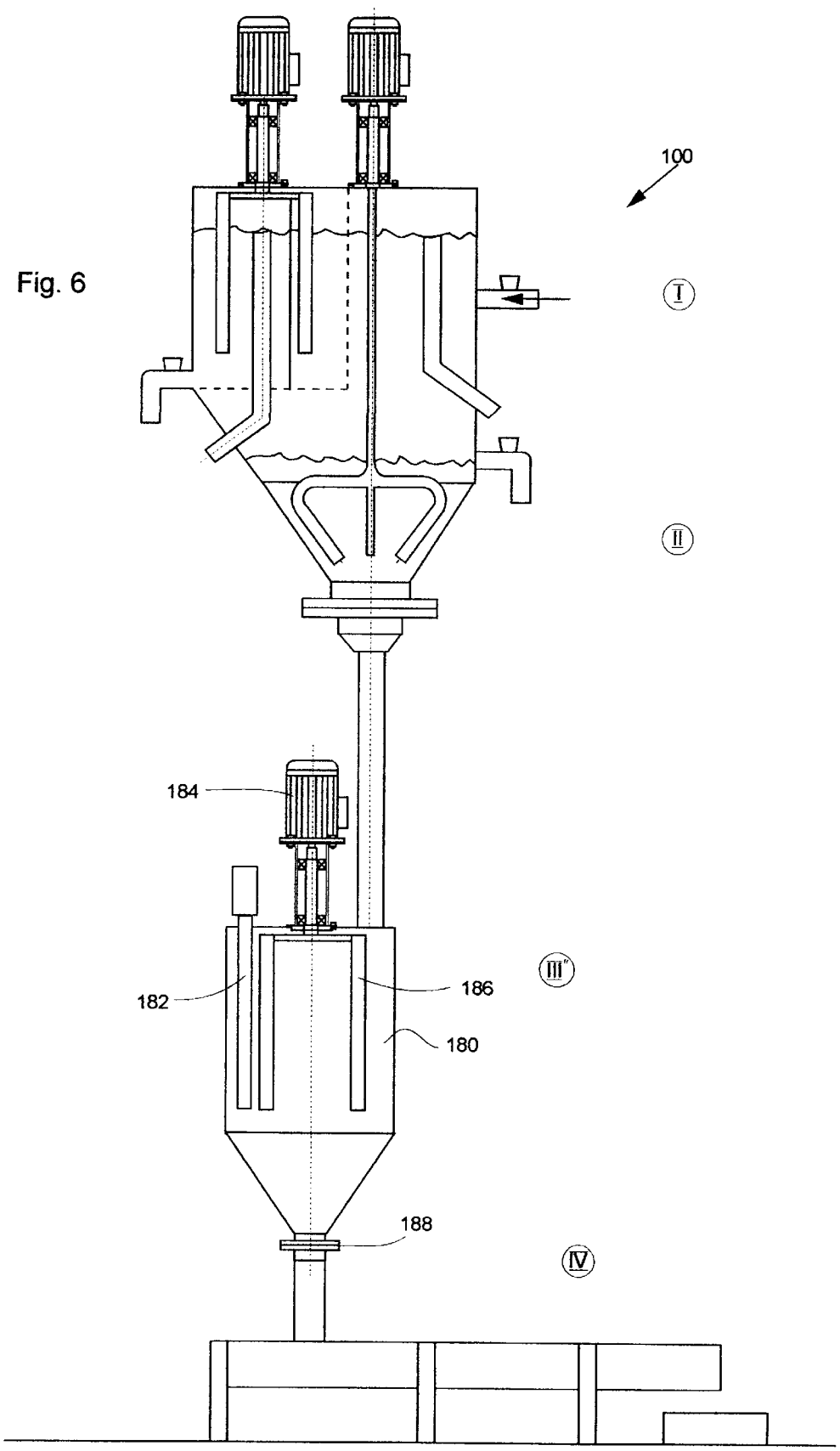
FIG. 6 is a longitudinal cross section of the first, second and another modified third stations of the device for releasing and separating seeds of vegetables and fruits from their coats, according to the present invention.

With reference now to FIG. 6, according to another embodiment of the invention, device 100 includes stations I and II as described above, yet station III is replaced by yet another modified third station indicated in FIG. 6 as station III". A full description of stations I and II is given above and is therefore not repeated with reference to FIG. 6.

Modified station III" is for further releasing the seeds from their coats and includes a fourth chamber 180. Implemented in chamber 180 is an ultrasonic horn 182 (e.g., Development Scale Reactor ST1000 by SonoChem, Chaus'e de Mons 348, 1070 Bruxelles, Belgium) for induction of ultrasonic vibrations within the seeds mixture in chamber 180. Further implemented in chamber 180 is a motor 184 operated second mixing mechanism 184 for circulating and steering the seeds within chamber 180, such that the seeds become better exposed to the vibrational effect imposed by ultrasonic horn 182, which effect is substantially higher closer to horn 182. When chamber 180 includes preferably substantially solely naked seeds, the seeds are collected through a gate 188. Preferably the seeds are directed into a station IV as described above to separate the debris formed from the naked seeds, afterwhich the seeds may be directly fed into further lines of seeds production such as disinfecting, drying, packaging lines, etc., by a suitable conveyor (not shown).

According to the present invention there is also provided a method for releasing and separating seeds of vegetables and fruits from their coats, the method is effected using any of the embodiments of device 100, as described hereinabove. In a preferred embodiment, the method according to the present invention includes (a) releasing and separating coated seeds from their coats by circulating a liquid mixture containing the coated seeds against a perforation element such that the coated seeds are scraped against the perforation element and are forced to pass through the perforation element, thereby at least part of the seeds are released from their coats to become at least partially naked seeds, wherein the separated coats form a light debris which is separated from the liquid mixture via a first differential weight separation mechanism (e.g., an upper drain); and (b) further releasing and separating coated seeds from their coats by vortexing the liquid mixture resulting from step (a), such that the seeds resulting from step (a) are scraped against one another, thereby further releasing the seeds from their coats, wherein the further released coats form a further light debris which is separated from the liquid mixture via a second differential weight separation mechanism (e.g., an upper drain).

In another preferred embodiment the method of the present invention farther includes (c) further releasing coated seeds from their coats by driving the liquid mixture resulting from step (b) via a direction changing tube having innerwalls, such that the seeds resulting from step (b) are scraped against the innerwalls, thereby further releasing the seeds from their coats, wherein the further released coats form a further light debris; and (d) further separating naked seeds from their coats by subjecting the liquid mixture resulting from step (c) to a third differential weight separation mechanism (e.g., a chute spillway).

In an alternative embodiment the method of the present invention for further separating naked seeds from their coats and liquids is by subjecting the liquid mixture resulting from step (b) above to a size based filtration mechanism such as a horizontal drum as shown and described with reference to FIG. 5.

In yet another alternative embodiment the method of the present invention for further releasing and separating naked seeds from their coats and liquids is by subjecting the liquid mixture resulting from step (b) above to vibrations imposed by an ultrasonic horn followed by a size based filtration mechanism (e.g., a chute spillway).

Figure 2:
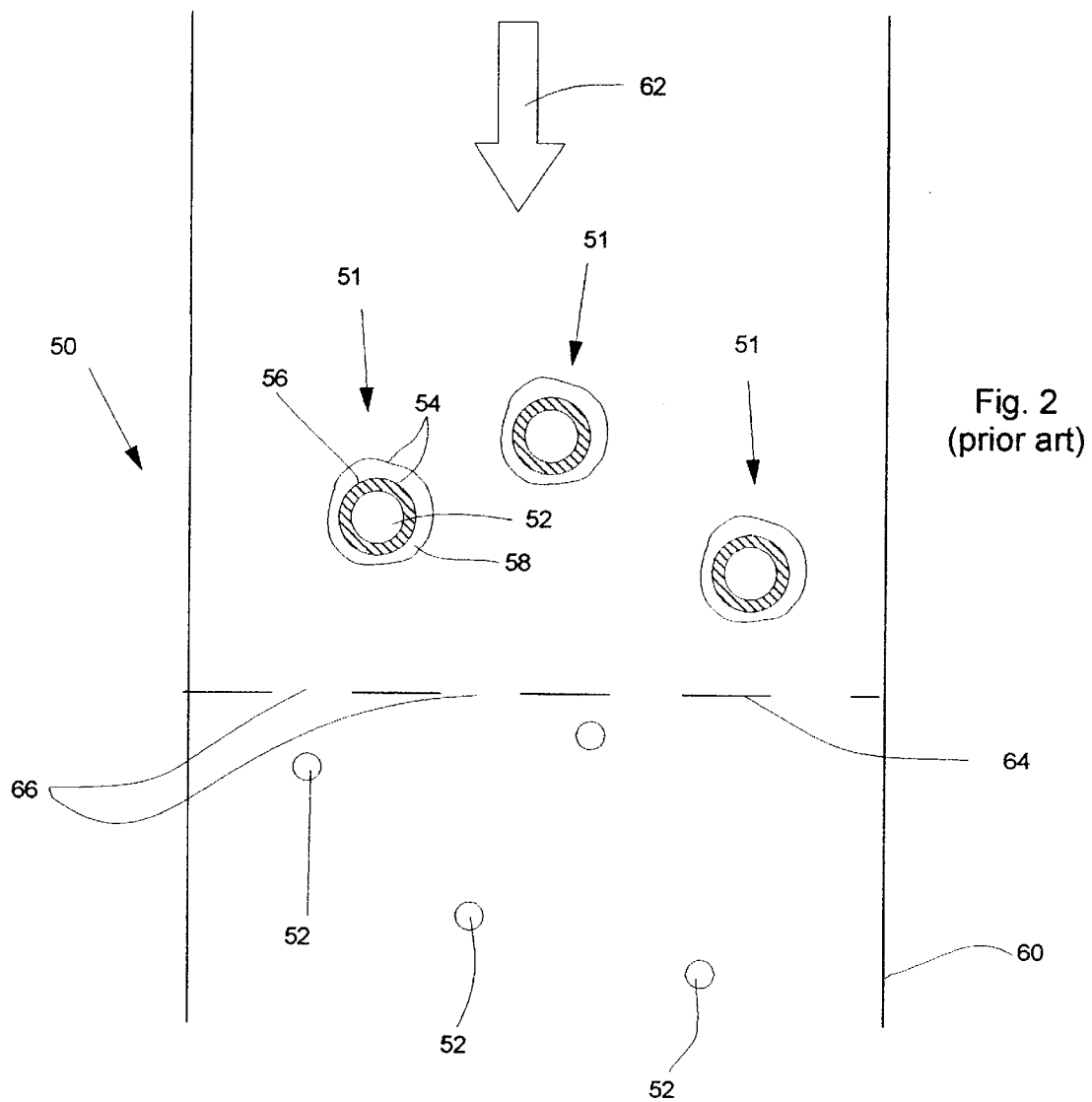
FIG. 2 is a cross section of a prior art mechanical seeds uncoating device.

Thus, the various embodiments of device 100 and of the method according to the present invention as herein described, enable quick and water saving production of seeds of various vegetables and fruits and is therefore advantageous over prior art techniques which are either time consuming, batch dependent and less reproducible, such as the fermentive based approach, or water wasteful, as described in the background section above for the mechanical seeds uncoating device (FIG. 2).

It will be appreciated by one ordinarily skilled in the art that any of the embodiments of device 100 described hereinabove may be lined in continuation to a seeds extraction device such as device 14 exemplified in FIG. 1 and described in detail in the background section above. In this case fruit or vegetable juices and seeds can be produced in a single manufacturing line.

However, in order to overcome the limitations of seeds extraction device 14, listed in the background section above, according to the present invention there is provided an improved seeds extraction device, referred herein as device 214, directed at replacing device 14, in case where fruit or vegetable juices and seeds are to be produced in a single manufacturing line.

Figure 7:
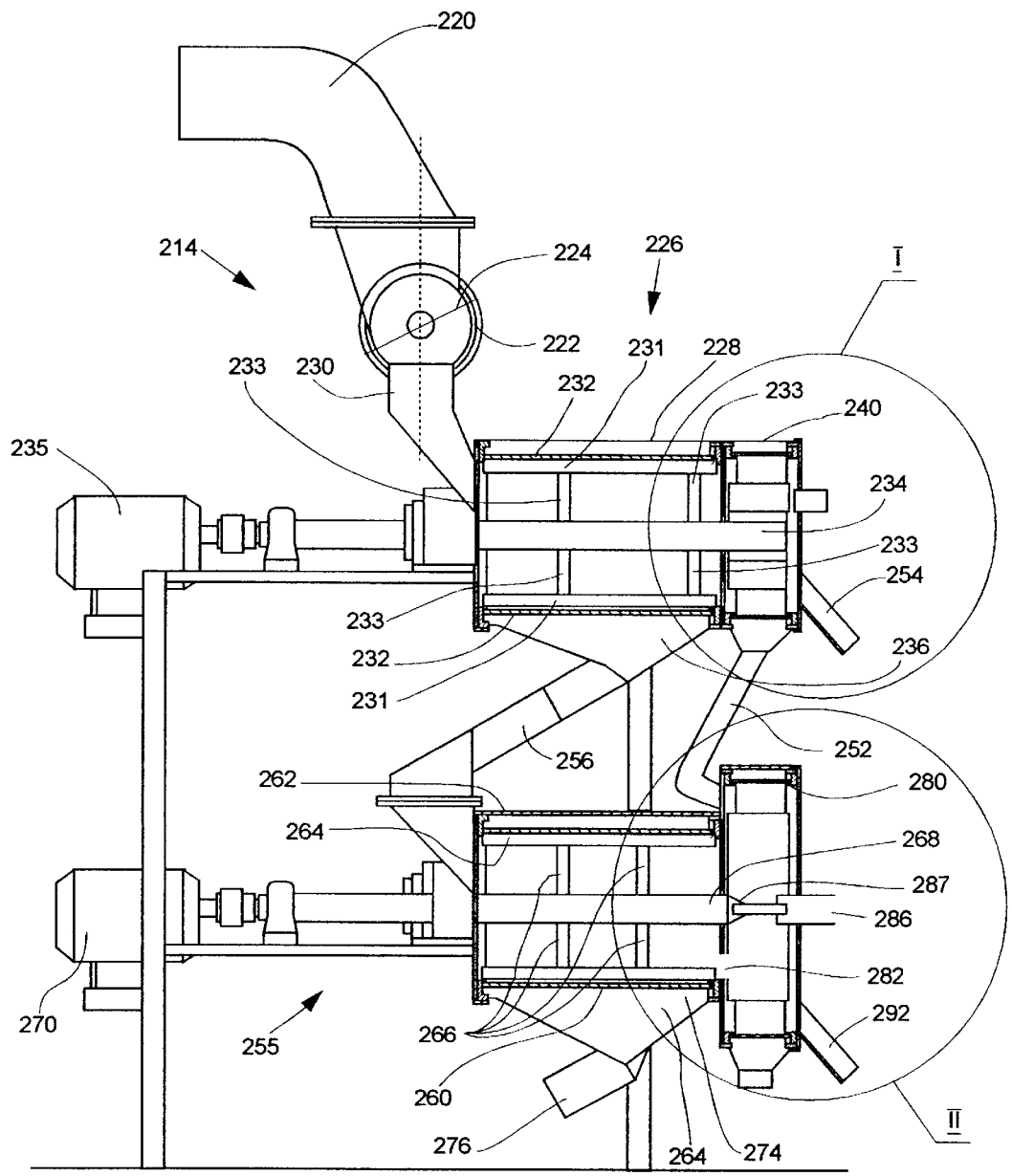
FIG. 7 is a cross section of a seeds extraction device according to the present invention.

With reference now to FIGS. 7–10. FIG. 7 presents a cross section of device 214. Like the prior art device 14 shown in FIG. 1, device 214 of the present invention is fed by whole vegetables or fruits of choice by a conveyor (not shown) similar to conveyor 12 of FIG. 1, which feeds device 214 via a first funnel 220. Similar to device 14, device 214 is characterized by three processing steps: (i) a chopping and mashing step; (ii) a peels separation step and (iii) a seeds extraction step, and accordingly includes (i) a chopping and mashing mechanism 222 equipped with rotating blades 224; (ii) a horizontal peels and debris separation drums arrangement 226 and (iii) a horizontal seeds extraction drums arrangement 258.

The whole fruits or vegetables fed into device 214 are chopped and mashed, typically in the presence of added water, by chopping and mashing mechanism 222. The chopped and mashed product is then transferred into drums arrangement 226, via a second funnel 230, for peels and debris separation.

Drums arrangement 226 includes a first compartment 228, similar in construction and operation to drum 26 of FIG. 1. Thus, first compartment 228 of drums arrangement 226 includes a first perforation element 232, enabling passage through of seeds, yet restricting passage of peels and debris. Implemented within compartment 228 is a first set of rotating impellers 231 connected via spacers 233 onto a first shaft 234, around which impellers 231 rotate via a first motor 235. Impellers 231 are positioned in close vicinity from element 232, thereby facilitating passage of juice, seeds and other small particles and small debris through first perforation element 232, preferably via a third funnel 237 into a first collector 236.

In the prior art device 14 shown in FIG. 1, components such as large peel fragments and debris which are too big to pass through perforation element 32 are discarded as waste via funnel 47. However, as mentioned, this waste includes plenty of seeds which adhere to it. In order not to lose these seeds, drums arrangement 226 includes a second compartment 240, shown enlarged in FIG. 8a and in a perpendicular cross section in FIG. 9a.

Second compartment 240 is in communication with compartment 228 of drums arrangement 226 via a dedicated low opening 239 formed therebetween (replacing funnel 47 in the prior art device 14 of FIG. 1), through which opening 239 compartment 240 is fed with peels, large debris and seeds adhered to them.

Second compartment 240 includes a second perforation element 242, which, similarly to first perforation element 232, enables passage through of seeds, yet restricting passage of peels and larger debris. Implemented within compartment 240 is a second set of rotating impellers 241 connected via spacers 243 onto first shaft 234, around which impellers 241 rotate via first motor 235. Since Second compartment 240 is fed with a starting material which is relatively dry, compartment 240 is supplemented with water via water inlet 245 for hydration. While impellers 241 rotate, water and seeds pass through perforation element 242 into a second collector 250 and onto a fourth funnel 252. At the same time, peels and larger debris are discarded via a fifth funnel 254, which functions similar to funnel 47 of the prior art device 14 of FIG. 1.

Seeds and other small particles and small debris collected in first collector 236, are transferred via a sixth funnel 256 into horizontal seeds extraction drums arrangement 258. Seeds and water arriving at fourth funnel 252 are also transferred into horizontal seeds extraction drums arrangement 258 in a manner detailed below.

Drums arrangement 258 includes a third compartment 260, similar in construction and operation to drum 28 of FIG. 1. Thus, third compartment 260 of drums arrangement 258 includes a third perforation element 262, enabling passage through of juice, yet restricting passage through of seeds. Implemented within compartment 260 is a third set of rotating impellers 264 connected via spacers 266 onto a second shaft 268, around which impellers 264 rotate via a second motor 270. By being in close vicinity to element 262, impellers 264 thereby facilitate passage of juice through third perforation element 262, via a seventh funnel 272 and a third collector 274 into an eighth funnel 276.

Third compartment 260 is in communication with a fourth compartment 280 of drums arrangement 258, via a dedicated second low opening 282 formed therebetween (replacing funnel 48 in the prior art device 14 of FIG. 1), through which opening 282 compartment 280 is fed with seeds. Fourth compartment 280 is further fed with seeds and water via funnel 252, which forms communication between second compartment 240 and fourth compartment 280.

Figure 8A:
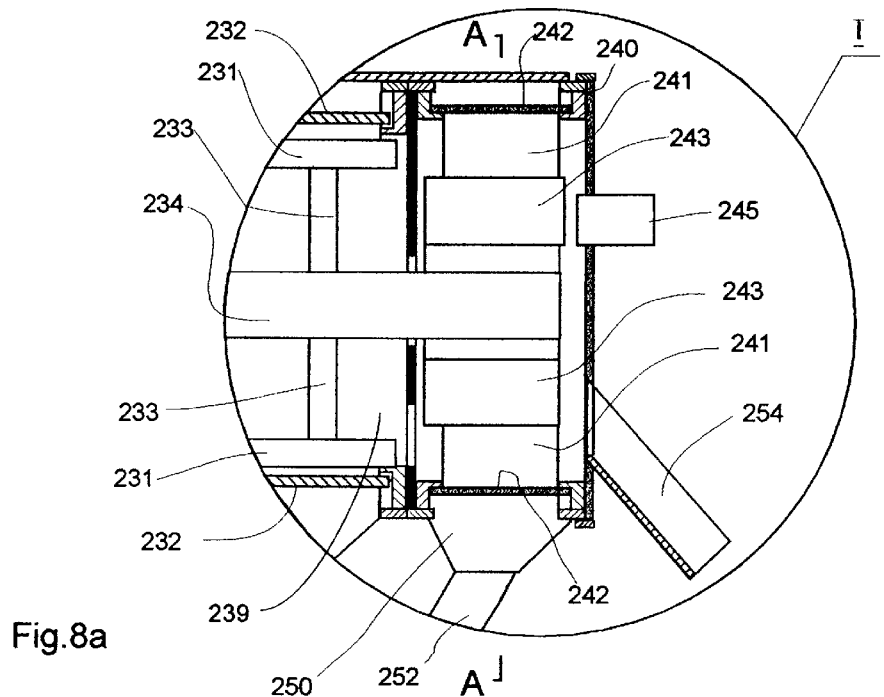
FIGS. 8a and 8b are enlargements of circles I and II of FIG. 7, respectively.
Figure 8B:
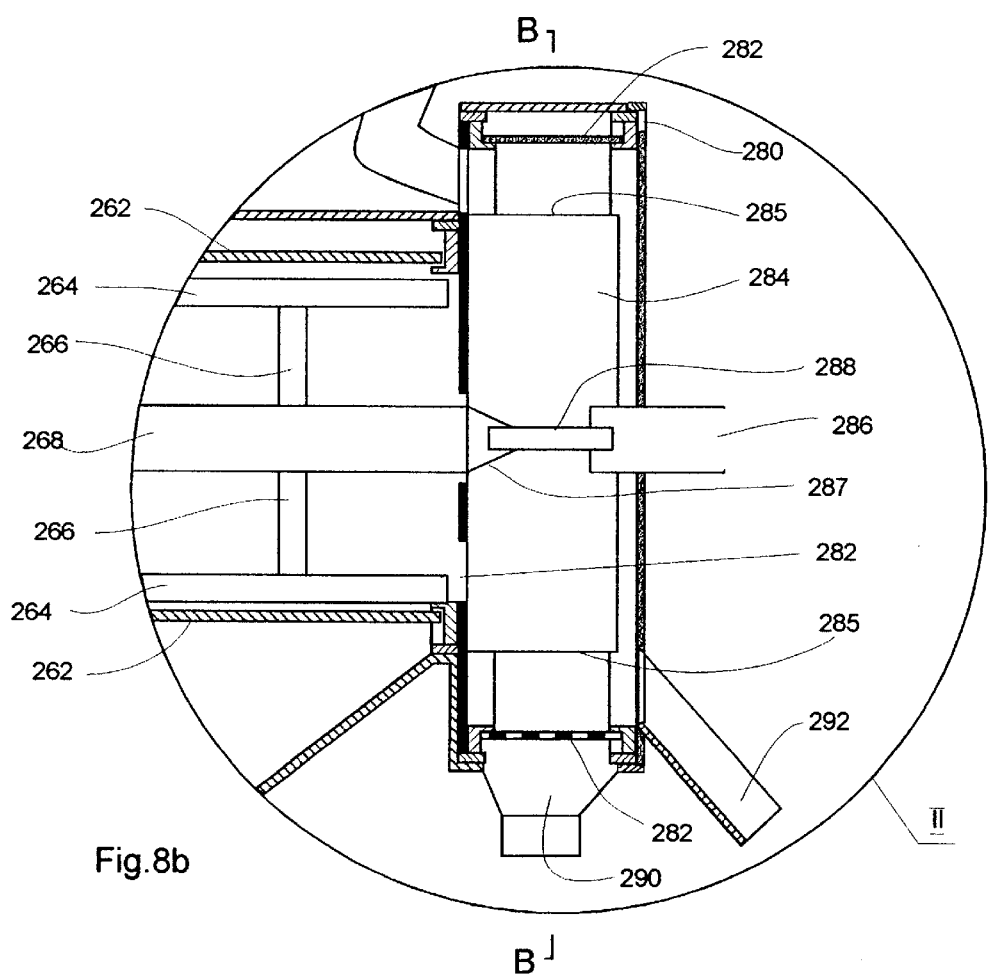
Figure 9A:
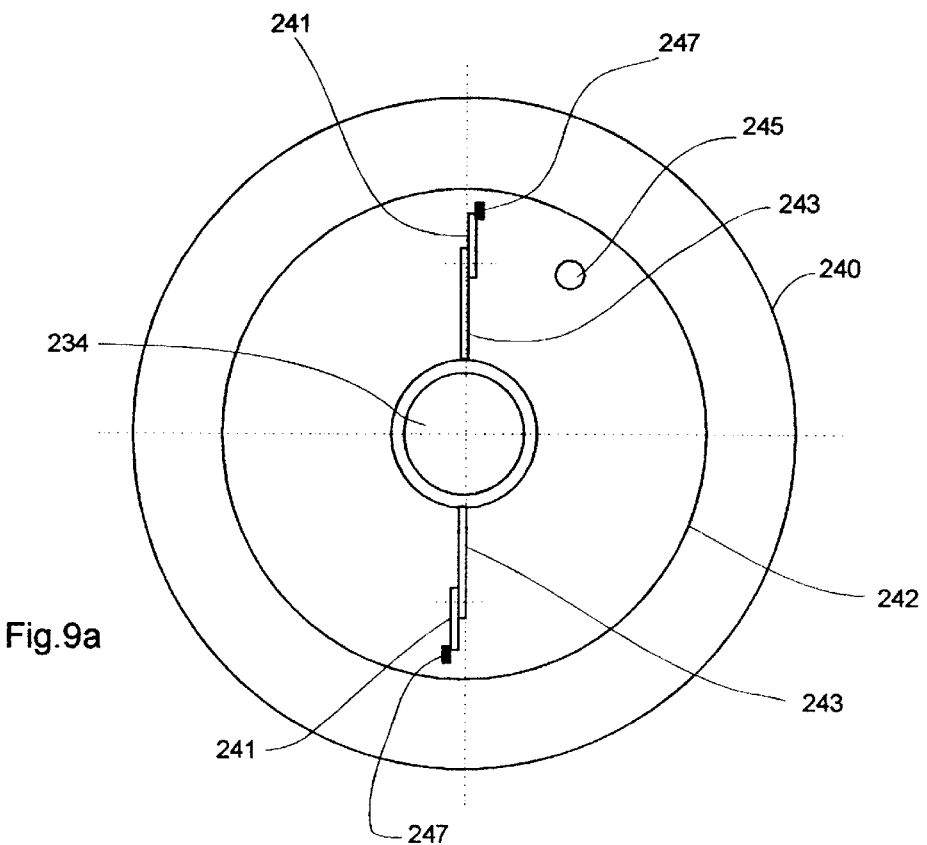
Figure 9B:
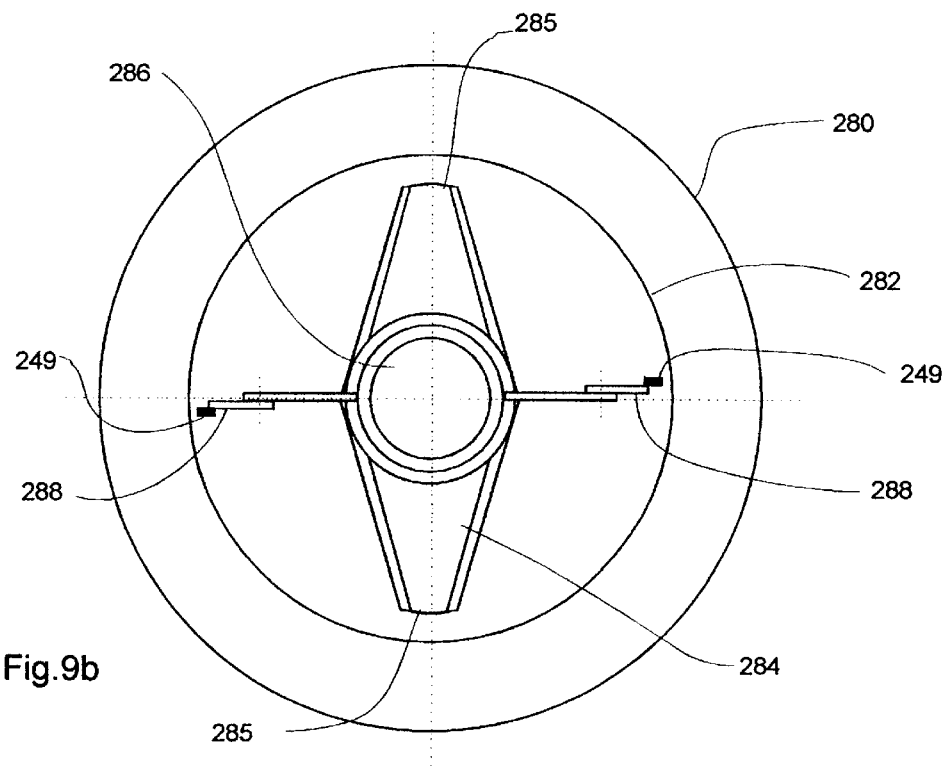
FIG. 9b is a view taken along section line B—B in FIG. 8b.

As best seen in FIGS. 8b and 9b, fourth compartment 280 includes a fourth perforation element 282, which, in similarity to third perforation element 232, permits passage of liquids yet blocks passage through of seeds. Implemented within compartment 280 is a rotary water sprinkler 284, having at least one, preferably two water outlets 285 oriented at opposite directions, such that when water under high pressure is forced through sprinkler 284, sprinkler 284 rotates. In a preferred embodiment, sprinkler 284 is rotatably accommodated at the end of shaft 268. To this end, sprinkler 284 is connected via a second water inlet 286 to a high pressure water source (not shown). In a preferred embodiment, sprinkler 284 is supplemented with a fourth set of impellers 288 rotating therewith.

While sprinkler 284 rotates and water under high pressure is forced into fourth compartment 280, the seeds thereat are scraped against fourth perforation element 282 and against each other and are therefore at least partially released from their coats, which released coats form small debris, part of which is discarded together with excess of water via a ninth funnel 290. The partially uncoated seeds are collected via a tenth funnel 292, functioning in a fashion similar to funnel 48 of the prior art device 14 shown in FIG. 1.

It will be appreciated that second 240 and fourth 280 compartments may be added as supplements to a pre-existing conventional seeds extraction device, such as device 14 of FIG. 1, to transform it to an improved device such as device 214 according to the invention.

Thus, seeds extractor device 214 according to the present invention is as suitable for juice manufacturing as the prior art extractor 14, yet in addition, device 214 is better suited to exploit seeds, as seeds are lost as waste along with peels to a much lesser extent. Furthermore, while seeds obtained as a byproduct of the prior art device 14 are fully coated, the seeds obtained using device 214 of the present invention are at least partially uncoated and therefore serve as better starting material for a commercial seeds production device, such as but not limited to the various embodiments of device 100 according to the invention described hereinabove.

While the invention has been described with respect to a limited number of embodiments, it will be appreciated that many variations, modifications and other applications of the invention may be made.

What is claimed is:
1. A device for releasing and separating seeds of vegetables or fruits from their coats such as peels and mucous, the device comprising a first station for releasing and separating the seeds from their coats, said first station including:
 (i) a container including a first chamber and a second chamber, said first and second chambers being at least partly separated therebetween by a perforation element, said first chamber being fed with a liquid mixture including coated seeds, said second chamber including a first upper drain, said container includes a first water inlet; and
 (ii) a mixing mechanism for circulating the liquid mixture within said first chamber, such that the coated seeds are scraped against said perforation element and are forced through said element from said first chamber into said second chamber, thereby at least part of the seeds are released from at least part of their coats to become at least partially naked seeds, wherein the separated coats form a lighter debris which is separated from the liquid mixture via said first upper drain by addition of water via said first water inlet.

2. The device of claim 1, further comprising a second station for further releasing and separating the seeds from their coats, said second station including:
 (i) a third chamber being in direct communication with said second chamber and being fed with the liquid mixture resulting from said first station, said third chamber including a second upper drain and a second water inlet; and
 (ii) a vortexing mechanism for vortexing the liquid mixture resulting from said first station, such that the seeds resulting from said first station are scraped against one another, thereby further releasing the seeds from their coats, wherein the further released coats form a further light debris which is separated from the liquid mixture in said third chamber via said second upper drain by addition of water via said second water inlet.

3. The device of claim 1, wherein said first chamber is substantially cylindrical.

4. The device of claim 2, wherein said first chamber includes a third upper drain.

5. The device of claim 2, wherein said first and third upper drains combine to a mutual outlet.

6. The device of claim 2, wherein said second chamber has a lower section forming said third chamber, rendering said second and third chambers a single chamber.

7. The device of claim 6, wherein said first and second upper drains are a single upper drain.

8. The device of claim 6, wherein said first and second water inlets are a single water inlet.

9. The device of claim 1, wherein said first chamber includes a lower valved outlet for periodically cleaning said first chamber.

10. The device of claim 1, wherein said second chamber includes a lower valved outlet for periodically cleaning said second chamber.

11. The device of claim 2, wherein said third chamber includes a lower valved outlet for periodically cleaning said third chamber.

12. The device of claim 1, wherein said mixing mechanism is selected from the group consisting of a first motor operated mixer, a centrifugation mechanism and a water stream based mixing mechanism.

13. The device of claim 2, wherein said vortexing mechanism includes a second motor operated mixer, said mixer includes a compressed gas release system, when operated, said mixer and said release of compressed gas collectively provide a vortexing effect.

14. The device of claim 2, further comprising a third station for further releasing the seeds from their coats, said third station including a direction changing tube being fed with the liquid mixture resulting from said second station, said direction changing tube having innerwalls and being oriented in space, such that gravitation forces the liquid mixture through said tube and such that the seeds resulting from said second station are subjected to a centrifugal force and are therefore scraped against said innerwalls, thereby said direction changing tube further releases the seeds from their coats.

15. The device of claim 14, wherein said direction changing tube is spiral.

16. The device of claim 14, further comprising a gated pathway for communicating between said second and third stations.

17. The device of claim 14, further comprising a fourth station for further separating the seeds from their coats, said fourth station including a differential weight separation mechanism.

18. The device of claim 17, wherein said differential weight separation mechanism includes a chute spillway.

19. The device of claim 2, further comprising a third station for further separating the seeds from their coats, said third station including a horizontal drum including a substantially cylindrical second perforation element, said second perforation element permitting passage through of small debris, seed coats and liquids, yet restricting passage through of the naked seeds, said drum further including rotatable impellers for fastening said passage of said debris, seed coats and liquids through said second perforation element.

20. The device of claim 19, further comprising a gated pathway for communicating between said second and third stations.

21. A seed extraction device for isolating juice and seeds from fruits or vegetables and for at least partially releasing and separating the seeds from seed coats, the device comprising:
 (a) a chopping and mashing mechanism for chopping and mashing the fruits or vegetables into a mash;
 (b) a horizontal peels and debris separation drums arrangement, for accepting said mash, said horizontal peels and debris separation drums arrangement including:
  (i) a first compartment including a first perforation element enabling passage through of the juice and seeds, yet restricting passage through of peels, said first compartment further including a first set of rotating impellers for facilitating said passage of the juice and seeds through said first perforation element; and
  (ii) a second compartment, being in communication via a dedicated low opening with said first compartment through which said second compartment being fed with the peels and seeds adhered thereto, said second compartment including a second perforation element enabling passage through of the seeds, yet restricting passage through of the peels, said second compartment further including a first water inlet for hydrating the seeds and peels, and a second set of rotating impellers for facilitating passage of water and seeds through said second perforation element; and
 (c) a horizontal seeds extraction drums arrangement for accepting the juice and seeds resulting from said horizontal peels and debris separation drums arrangement, for isolating the juice from seeds and for partially releasing the seeds from their coats, said horizontal seeds extraction drums arrangement including:
  (i) a third compartment communicating with said first compartment for accepting the juice and seeds resulting therefrom, said third compartment including a third perforation element enabling passage through of the juice, yet restricting passage through of the seeds and further including a third set of rotating impellers for facilitating said passage through of the juice; and
  (ii) a fourth compartment being in communication via a dedicated second low opening with said third compartment through which said fourth compartment being fed with the seeds accumulating in said third compartment, said fourth compartment is further communicating with said second compartment for accepting the seeds resulting therefrom, said fourth compartment including a fourth perforation element permitting passage through of liquids yet restricting passage through of seeds, and further including a rotary water sprinkler having at least one water outlet positioned such that when water under high pressure is forced therethrough, said sprinkler rotates and the seeds within said fourth compartment are scraped against said fourth perforation element and against each other and are therefore at least partially released from their coats, the coats forming a debris at least partly separated from the seeds through said fourth perforation element.

22. A seed extraction device including:
 (a) a chopping and mashing mechanism for chopping and mashing the fruits or vegetables into a mash;
 (b) a first compartment for accepting said mash, said first compartment including a first perforation element enabling passage through of the juice and seeds, yet restricting passage through of peels, said first compartment further including a first set of rotating impellers for facilitating said passage of the juice and seeds through said first perforation element; and
 (c) a third compartment communicating with said first compartment for accepting the juice and seeds resulting therefrom, said third compartment including a third perforation element enabling passage through of the juice, yet restricting passage through of the seeds and further including a third set of rotating impellers for facilitating said passage through of the juice;
the improvement comprising a supplemented device for isolating juice and seeds from fruits or vegetables and for at least partially releasing and separating the seeds from seed coats comprising:
 (a) a second compartment, being in communication via a dedicated low opening with said first compartment through which said second compartment being fed with the peels and seeds adhered thereto, said second compartment including a second perforation element enabling passage through of the seeds, yet restricting passage through of the peels, said second compartment further including a first water inlet for hydrating the seeds and peels, and a second set of rotating impellers for facilitating passage of water and seeds through said second perforation element; and
 (b) a fourth compartment being in communication via a dedicated second low opening with said third compartment through which said fourth compartment being fed with the seeds accumulating in said third compartment, said fourth compartment is further communicating with said second compartment for accepting the seeds resulting therefrom, said fourth compartment including a fourth perforation element permitting passage through of liquids yet restricting passage through of seeds, and further including a rotary water sprinkler having at least one water outlets positioned such that when water under high pressure is forced therethrough, said sprinkler rotates and the seeds within said fourth compartment are scraped against said fourth perforation element and against each other and are therefore at least partially released from their coats, the coats forming a debris at least partly separated from the seeds through said fourth perforation element.

* * * * *